US009650520B2

(12) United States Patent
Luo et al.

(10) Patent No.: US 9,650,520 B2
(45) Date of Patent: May 16, 2017

(54) METHODS FOR PREPARING VANADIUM DIOXIDE COMPOSITE POWDERS, VANADIUM DIOXIDE POWDER SLURRY, AND VANADIUM DIOXIDE COATING FOR INTELLIGENT TEMPERATURE CONTROL

(75) Inventors: Hongjie Luo, Shanghai (CN); Yiliao Liu, Guangdong (CN); Yanfeng Gao, Shanghai (CN); Zhaohui Cai, Guangdong (CN); Yuwei Lin, Guangdong (CN); Chuanxiang Cao, Shanghai (CN); Shaobo Wang, Shanghai (CN); Minoru Kanehira, Shanghai (CN)

(73) Assignees: SHANGHAI INSTITUTE OF CERAMICS, CHINESE ACADEMY OF SCIENCES, Shanghai (CN); FSPG HI-TECH CO., LTD., Guangdong (CN)

( * ) Notice: Subject to any disclaimer, the term of this patent is extended or adjusted under 35 U.S.C. 154(b) by 146 days.

(21) Appl. No.: 14/373,302

(22) PCT Filed: Mar. 7, 2012

(86) PCT No.: PCT/CN2012/072021
§ 371 (c)(1),
(2), (4) Date: Jul. 18, 2014

(87) PCT Pub. No.: WO2013/107081
PCT Pub. Date: Jul. 25, 2013

(65) Prior Publication Data
US 2015/0132494 A1 May 14, 2015

(30) Foreign Application Priority Data

Jan. 19, 2012 (CN) .......................... 2012 1 0017938

(51) Int. Cl.
| C09D 7/12 | (2006.01) |
| C09D 5/00 | (2006.01) |
| C09D 133/00 | (2006.01) |
| C09D 163/00 | (2006.01) |
| C09D 167/00 | (2006.01) |
| C09D 175/04 | (2006.01) |
| C09D 183/00 | (2006.01) |
| C01G 31/02 | (2006.01) |
| C09D 5/26 | (2006.01) |
| C09D 133/02 | (2006.01) |
| C09D 5/02 | (2006.01) |
| C07F 5/06 | (2006.01) |

(Continued)

(52) U.S. Cl.
CPC .............. *C09D 5/26* (2013.01); *C01G 31/02* (2013.01); *C07F 5/061* (2013.01); *C07F 7/10* (2013.01); *C07F 7/28* (2013.01); *C07F 9/00* (2013.01); *C08K 5/1515* (2013.01); *C08K 5/17* (2013.01); *C08K 5/544* (2013.01); *C08K 5/5435* (2013.01); *C09D 5/028* (2013.01); *C09D 7/1216* (2013.01); *C09D 133/02* (2013.01); *C09D 175/04* (2013.01); *C01P 2002/54* (2013.01); *C08K 3/20* (2013.01); *C08K 3/22* (2013.01)

(58) Field of Classification Search
CPC ........ C09D 5/028; C09D 5/26; C09D 7/1216; C09D 175/04; C09D 133/02; C01G 31/02; C08K 5/544; C08K 5/5435; C08K 5/17; C08K 5/1515; C08K 3/22; C08K 3/20; C07F 9/00; C07F 7/28; C07F 7/10; C07F 5/061; C01P 2002/54
USPC ............ 427/358, 427.4, 428.01; 106/287.11, 106/287.14, 287.17, 287.19; 524/543; 549/208; 556/9, 27
See application file for complete search history.

(56) References Cited

U.S. PATENT DOCUMENTS

| 8,709,306 | B2* | 4/2014 | Jin | ........................... B01J 23/22 252/583 |
| 2010/0187982 | A1 | 7/2010 | Hsu et al. | |
| 2013/0344335 | A1* | 12/2013 | Gao | ........................ C01G 31/02 428/402 |

FOREIGN PATENT DOCUMENTS

| CN | 1162949 A | 10/1997 |
| CN | 1621459 A | 6/2005 |

(Continued)

OTHER PUBLICATIONS

Zheng et al., Preparation and Characterization of VO2 Nanopowders, Journal of Solid State Chemistry 156, 274-280 (2001).*

(Continued)

*Primary Examiner* — William Phillip Fletcher, III
(74) *Attorney, Agent, or Firm* — Alleman Hall Creasman & Tuttle LLP

(57) ABSTRACT

A vanadium dioxide coating for intelligent temperature control is formed by mixing a vanadium dioxide powder slurry, a polymer emulsion, and coating additives, and then coating the mixture onto a substrate. The vanadium dioxide powdery slurry comprises vanadium dioxide composite powders and a dispersion medium, the composite powders comprising vanadium dioxide nanopowders having a chemical composition of $V_{1-x}M_xO_2$, and the surface of the vanadium dioxide nanopowders being attached to organic modified long-chain molecules, wherein M is a doped element, and $0 \leq x \leq 0.5$. Through using the vanadium dioxide powders and the slurry thereof having an organic modified surface, the coating has higher visible light transmittance, can almost completely screen ultraviolet rays, and simultaneously intelligently adjust infrared rays.

19 Claims, 2 Drawing Sheets

(51) Int. Cl.

| | | |
|---|---|---|
| C07F 7/10 | (2006.01) | |
| C07F 7/28 | (2006.01) | |
| C07F 9/00 | (2006.01) | |
| C08K 5/1515 | (2006.01) | |
| C08K 5/17 | (2006.01) | |
| C08K 5/5435 | (2006.01) | |
| C08K 5/544 | (2006.01) | |
| C08K 3/20 | (2006.01) | |
| C08K 3/22 | (2006.01) | |

(56) References Cited

FOREIGN PATENT DOCUMENTS

| CN | 1935909 A | | 3/2007 |
|---|---|---|---|
| CN | 101007928 A | | 8/2007 |
| CN | 101265374 A | | 9/2008 |
| CN | 101982514 A | | 3/2011 |
| CN | 101993657 A | | 3/2011 |
| CN | 102066261 A | * | 5/2011 |
| CN | 102120615 A | | 7/2011 |
| WO | 2011032814 A1 | | 3/2011 |
| WO | WO 2011/032814 A1 | * | 3/2011 |

OTHER PUBLICATIONS

Osmolovskaya et al., Synthesis of Vanadium Dioxide Thin Films and Nanopowders: A Brief Review, Rev. Adv. Mater. Sci. 36 (2014) 70-74.*

Kaurkovskaya et al., The Radiation-Enhanced "Slow" Phase Transition on the Surface of Vanadium Dioxide, High Energy Chemistry, 2010, vol. 44, No. 2, pp. 101-104.*

Guinneton et al., Optimized Infrared Switching Properties in Thermochromic Vanadium Dioxide Thin Films: Role of Deposition Process and Microstructure, Thin Solid Films 446 (2004) 287-295.*

Chen et al., The Preparation and Characterization of Surface-Modified VO2 Nanopowders, Synthesis and Reactivity in Inorganic, Metal-Organic and Nano-Metal Chemistry, 37:275-277, 2007.*

Jin et al., Relationship Between Transition Temperature and x IN V1-xWxO2 Films Deposited by Dual-Magnetron Sputtering, Jpn. J. Appl. Phys. vol. 34 (1995) pp. 1459-2460.*

Li, S-Y et al., "Nanothermochromics: Calculations for VO2 nanoparticles in dielectric hosts show much improved luminous transmittance and solar energy transmittance modulation" Journal of Applied Physics, vol. 108, No. 6, Sep. 2010, 8 pages.

ISA State Intellectual Property Office of P. R. China, International Search Report and Written Opinion of PCT/CN2012/072021, Nov. 1, 2012, 8 pages.

* cited by examiner

METHODS FOR PREPARING VANADIUM DIOXIDE COMPOSITE POWDERS, VANADIUM DIOXIDE POWDER SLURRY, AND VANADIUM DIOXIDE COATING FOR INTELLIGENT TEMPERATURE CONTROL

TECHNICAL FIELD

The present invention relates to a vanadium dioxide coating for intelligent temperature control with advantages of thin thickness, high accuracy, high transparency, low haze, strong adhesion to substrates, and prominent ageing resistance, which is mainly used to prepare films on glasses, and applied to the field of building doors and windows, automotive glasses, or industrial metal containers.

BACKGROUND

China's building energy consumption has accounted for 27.8% of the total social energy consumption, and the energy consumption of heating and air conditioning accounts for 55% of the building energy consumption. In modern buildings, the area proportion of glass in the outer walls is getting higher and higher. It has been measured that heat transfer through glass windows accounts for 48% and 71% in winter and summer, respectively. Where an air conditioner is used to adjust the indoor temperature, as the cooling temperature increases by 2° C., the cooling load will decrease by 20%; as the heating temperature decreases by 2° C., the heating load will decrease by 30%. Energy consumption can be significantly reduced by attaching a heat-insulating film or coating a heat-insulating coating on the glass.

At present, heat-insulating films or coatings on the market still focus on the performance of blocking infrared ray without the ability to respond to environmental change. They merely have the function of reflecting infrared light rather than transmitting the infrared ray at low temperatures, being unable to play a role in adjusting the temperature difference between indoors and outdoors intelligently. Therefore, a material must be found that is able to adjust solar heat intelligently, so as to make the inside of buildings warm in winter and cool in summer.

Vanadium dioxide materials have a first-order phase transition property, being able to sense a change in ambient temperature, and intelligently respond to the change to realize the selective transmission or shading for the spectrum of sunlight. Generally, when the ambient temperature is lower than the phase transition temperature, a film or coating containing vanadium dioxide is almost completely transparent for visible light and mid-infrared light of the sunlight; when the ambient temperature exceeds the semiconductor-metal phase transition temperature, vanadium dioxide performs a phase transition and turns to R (rhombohedral) phase. At this time, the material can selectively shade the mid-infrared light, and achieve the purpose of being transparent (allowing the visible light to transmit) and insulating heat. The semiconductor-metal phase transition of vanadium dioxide is a heat-induced reversible change, and the temperature-switching effect can be used for intelligent control for transmitting and blocking mid-infrared rays. By the advantage of low transmission at high temperatures and high transmission at low temperatures in the infrared region of vanadium dioxide, an energy saving window system of full intelligence can be prepared.

Optical calculation indicates that (S.-Y. Li, G. A. Niklasson, and C. G. Granqvist, Nanothermochromics: Calculations for $VO_2$ nanoparticles in dielectric hosts show much improved luminous transmittance and solar energy transmittance modulation, JOURNAL OF APPLIED PHYSICS 108, 063525 2010) if vanadium dioxide nanopowders are dispersed into other substrates such as transparent macromolecules, the visible light transmittance can be improved to a practical level in addition to keeping the optical control property of vanadium dioxide, by which energy saving reconstruction for glass, wall space, and outer walls of transportation such as vehicles and ships in service can be carried out. A coating material for intelligent temperature control can be prepared by making the vanadium dioxide materials into nano-size and composited with organic modifying materials. However, due to their small specific surface area and high surface free energy, the nano-particles tend to aggregate with each other, which determines that when vanadium dioxide nano-particles are directly added into coating material, they hardly perform as nano-materials, and tend to aggregate with each other, which has an influence on the optical properties and appearance of the coating, thereby limiting the application of the material on glass films and transparent glass. For example, Chinese patent application No. 200410051965 refers to a vanadium dioxide coating material for intelligent temperature control, however the vanadium dioxide particles referred to belong to unmodified vanadium dioxide particles, and do not relate to the pre-treatment for the particles, especially the pre-dispersion treatment for the vanadium dioxide particles referred to in the present invention, and the improvement of dispersibility and chemical stability due to the organic modification treatment.

Chinese patent application No. 200610117027.4 refers to a method for preparing vanadium dioxide suspensions, and relates to dispersion treatment for vanadium dioxide powders; however, this treatment adopts an inorganic modification method, which is substantially different from the preparation of vanadium dioxide composite particles by an organic modification method. Additionally, this invention adopts an acidic or alkaline condition, which would destroy the structure of vanadium dioxide.

Chinese patent application No. 200980123044.0 (with of title of thermochromic microparticles, dispersions thereof, and manufacturing method thereof, as well as light-modulating coating materials, light-modulating films and light-modulating inks) refers to a surface treatment for dimming painting particles; however, it does not present the specific modification method, and the treatment objects of this invention are composite particles of titanium dioxide and vanadium dioxide, which are substantially different from the vanadium dioxide composite particles in the present invention.

Chinese patent application No. 200810033032.6 refers to a film for intelligent thermal insulation and the preparation method thereof, however, it does not relate to the organic modification pre-dispersion treatment for $VO_2$ particles, especially the particles referred in the present invention. In the present invention, the organically modified vanadium dioxide powders have greatly improved dispersibility after modification treatment, especially the treatment with silane coupling agent, and can play the role of nano-materials indeed, which is close to the results of theoretical calculations, and the prepared coating for intelligent temperature control has a notable improvement of control performance for infrared light, which is close to the results of theoretical calculations.

Chinese patent application with publication No. CN101265374A discloses a vanadium dioxide high polymer film for intelligent temperature control under solar heat, which is prepared by adding vanadium dioxide to a polymer film directly. However, the coating of the present invention is prepared by a coating method, and the prepared coating of the present invention is of higher transparency, lower haze, and excellent performance.

SUMMARY OF INVENTION

The preparation of a film by using vanadium dioxide powders and the composites containing vanadium dioxide and other materials is simple and convenient for mass production, and the prepared film can not only be applied for energy saving reconstruction of existing glass windows, but also can be coated on various substrates, extending the applicability of vanadium dioxide. However, in the case that vanadium dioxide powders are prepared into a vanadium dioxide slurry, a film, or a coating, they are desired to have excellent dispersibility and chemical stability.

Herein, the present invention provides vanadium dioxide composite powders, including vanadium dioxide nanopowders which have a chemical composition of $V_{1-x}M_xO_2$, and the surfaces of which are grafted with organic modifying long-chain molecules, wherein M represents doping elements, and $0 \leq x \leq 0.5$.

The vanadium dioxide composite powders of the present invention are obtained by modifying the surfaces of vanadium dioxide nanopowders and the doped vanadium dioxide nanopowders. As opposed to the conventional unmodified or inorganically clad and modified vanadium dioxide powders, in the present invention, the surfaces of the vanadium dioxide powders are grafted with organic modifying long-chain molecules by means of an organic modifier, thereby improving the chemical stability and dispersibility of vanadium dioxide powders. The vanadium dioxide composite powders provided by the present invention possess good stability and dispersibility, can be stored for a long time, can serve as powders for intelligent thermal insulation for preparing a coating or painting, and can be used in the thermal insulation of glass, outer walls, etc. As opposed to common thermal insulation materials, they can drastically block infrared light at a temperature higher than their phase transition temperature, while transmitting infrared rays well at a temperature lower than their phase transition temperature, which is reversible and by which the intelligent regulation of solar heat can be realized.

Preferably, the vanadium dioxide composite powders of the present invention contain 0.1~50%, preferably 1~10% of organic modifying long-chain molecules. If the content of the organic modifying long-chain molecules is too low, complete cladding for the surfaces of the powders will not be realized; if the content of the organic modifying long-chain molecules is too high, the organic molecules will tangle with each other, having a bad influence on the dispersion effect on the contrary.

Preferably, the length of the organic modifying long-chain molecules is 0.1 nm~100 nm.

The present invention relates to organic surface modification of vanadium dioxide nano-particle, and effectively improves the dispersibility and chemical stability of nanopowders of vanadium dioxide and doped vanadium dioxide.

The organic modifying long-chain molecules may be functionalized organic long chains such as long-chain alkyls, polyacrylic acid groups, polyvinyl alcohol groups, epoxy groups, long-chain alkylamino groups, halogenated long-chain alkyls, and carboxylated long-chain alkyls etc.

The surfaces of the vanadium dioxide composite powders of the present invention are grafted and clad with organic modifiers such that the surface property of vanadium dioxide of the present invention can change. Depending on the selected groups, the vanadium dioxide composite particle has an improved dispersibility in various solvents, expanding the application of vanadium dioxide particles in painting or coating for intelligent temperature control.

Preferably, the vanadium dioxide powders in the vanadium dioxide composite powders of the present application may be in rutile phase, with a phase transition temperature adjustable in a range of −20~70° C. The portion of rutile phase vanadium dioxide may be as high as 80%, even up to 100%. The vanadium dioxide powders have a first-order phase transition property, being able to sense a change in ambient temperature, and intelligently respond to the change to realize selective transmission or shading for the spectrum of sunlight. Generally, when the ambient temperature is lower than the phase-transformation temperature, a film or coating containing vanadium dioxide is almost completely transparent for the visible light and mid-infrared light of the sunlight; when the ambient temperature exceeds the semiconductor-metal phase transition temperature, vanadium dioxide performs a phase transformation and turns to R phase. At this time, the material can selectively shade the mid-infrared light, and achieve the purpose of being transparent (allowing the visible light to transmit) and insulating heat. The semiconductor-metal phase transition of vanadium dioxide is a heat-induced reversible change, and the temperature-switching effect can be used for intelligent control for transmitting and blocking mid-infrared ray.

The doping elements M specified in the present invention may be any one or any combination of transition metal elements with an atomic number from 21 to 30 near vanadium in the periodic table, tin and its nearby elements in the periodic table, and W, Mo, Ru, Nb, etc. The transition metal elements with atomic number from 21 to 30 near vanadium in the periodic table include Sc, Ti, Cr, Mn, Fe, Co, Ni, Cu and Zn, the tin and its nearby elements in the periodic table include In, Sb, Sn, Ga, Ge, Pb and Bi. The doping elements are preferably W, Mo, Bi, Sn, Fe, Zn, and Ti.

The size and morphology of vanadium dioxide powders can be controlled by the above-mentioned doping elements, and the phase transition temperature of vanadium dioxide can also be regulated by the above-mentioned doping elements.

In the present invention, the doped vanadium dioxide powders preferably have granular shapes and the aspect ratio of the granules may be 1:1~10:1, preferably 1:1~5:1, more preferably 1:1~2:1. The granule size may be 1 μm or less in at least one dimension, preferably 100 nm or less in at least one dimension, more preferably 100 nm or less in three dimensions, most preferably 70 nm or less in three dimensions. The granular shapes may be various shapes such as nearly a sphere, ellipse, snowflake, cube, sheet, etc.

The vanadium dioxide powders with the above mentioned size and morphology can have better dispersibility. The dispersibility of the modified composite powders can be further improved.

The present invention further provides a method for preparing the vanadium dioxide composite powders, comprising the following processes: (1) dispersing vanadium dioxide nanopowders into a dispersion medium to obtain a mixture A; (2) adding dispersion-assisting agents and organic modifiers for forming organic modifying long-chain molecules on the surface of the vanadium dioxide nanopowders into the mixture A, stirring until fully, evenly mixed to obtain a mixture B; and (3) drying the mixture B to obtain the organically modified vanadium dioxide composite powders.

The vanadium dioxide nanopowders may be rutile phase vanadium dioxide nanoparticle or doped rutile phase vanadium dioxide nanoparticle, which can be prepared according to the method provided by published patent documents, or other known methods. The particle size of the powders is preferably 200 nm or less. The morphology of the powders may be granule, nanorod, and snowflake particles. When preparing doped rutile phase vanadium dioxide nanoparticles, before doping elements, the precursor ($V^{4+}$ ion aqueous solution) may be treated with alkaline reagents, so as to obtain vanadium dioxide powders with s controllable size (1 µm or less in at least one dimension) and morphology (granular, with an aspect ratio of 10:1 or less). The prepared vanadium dioxide powders are of small grain size, evenly distributed grain diameter, and stable crystal form, and present favorable dispersibility in water and dispersants (such as polyvinylpyrrolidone), making the dispersion easy for coating on a substrate such as glass, and suitable for preparing a film or coating made from vanadium dioxide powders.

With regard to the method for preparing the vanadium dioxide composite powders of the present invention, the dispersion-assisting agents added in process (2) may be one or more agents selected from the group consisting of polyvinyl alcohol, polyvinylpyrrolidone, organically modified polysiloxane dipropylene glycol monomethyl ether solution, silicone surfactants, fluorosurfactants, and other known dispersion-assisting agents in the art.

With regard to the method for preparing the vanadium dioxide composite powders of the present invention, the organic modifiers added in process (2) may be stearic acid, polyacrylic acid, silane coupling agents, aluminate coupling agents, titanate coupling agents, etc., preferably silane coupling agents with macromolecular long chains.

By means of coupling agents, the surface of vanadium dioxide can be grafted with organic long-chain molecules, thereby greatly improving the chemical stability and dispersibility of vanadium dioxide powders.

The dispersion medium used in the method for preparing the vanadium dioxide composite powders of the present invention may be one or more inert solvents such as ethanol, isopropanol, chloroform, dimethylformamide, dimethyl sulfoxide, dichloroethane, acetone, etc.

In the case that the organic modification is performed in inert solvent, vanadium dioxide can be prevented from denaturating, and the powders thereof can have a better chemical stability.

The method for preparing the vanadium dioxide composite powders of the present invention uses innovative preparation technologies, and the surface modification process by organic modifiers can effectively improve the dispersibility and chemical stability of vanadium dioxide ($VO_2$) nanopowders and doped vanadium dioxide nanopowders.

In addition, the present invention provides a vanadium dioxide powder slurry containing the vanadium dioxide composite powders of the present invention.

The vanadium dioxide powder slurry provided by the present invention may contain: (1) vanadium dioxide composite powders, including vanadium dioxide nanopowders which have a chemical composition of $V_{1-x}M_xO_2$, and the surfaces of which are grafted with organic modifying long-chain molecules, wherein M represents doping elements, and $0 \leq x \leq 0.5$; and (2) a dispersion medium.

The weight ratio between the vanadium dioxide composite powders and the dispersion medium in the vanadium dioxide powder slurry of the present invention may be 1:1~1:1000, preferably 1:10~1:100. The vanadium dioxide composite powders prepared by the method of the present invention can be effectively dispersed at a weight percentage ranging from 0 to 50 wt %, and preferably from 0 to 10 wt % in light of the application of the intelligent coating. Excessive content of the vanadium dioxide composite powders may affect the light transmittance of the coating, while insufficient content may result in the coating hardly demonstrating intelligent thermal insulation effects.

Further, one or more solvents selected from the group consisting of deionized water, ethanol, propanol, isopropanol, ethyl acetate, toluene, and butanone may be the dispersion medium in the vanadium dioxide powder slurry of the present invention.

In addition, the vanadium dioxide powder slurry of the present invention may contain dispersion-assisting agents which may be one or more agents selected from the group consisting of polyacrylate, polyacrylamide, polyphosphate, polyvinyl alcohol, polyvinylpyrrolidone, and modified polyesters, modified polyurethanes, and modified acrylic acid dispersion agents.

Furthermore, the present invention further provides a vanadium dioxide coating for intelligent temperature control, formed by mixing the vanadium dioxide powder slurry of the present invention, a polymer emulsion, and coating additives together to form a mixture and coating the mixture on a substrate.

The solid content of the vanadium dioxide powders in the vanadium dioxide coating for intelligent temperature control of the present invention may be 0.1~50%, preferably 2%-20%. Likewise, in the case that the solid content of the vanadium dioxide powders in the vanadium dioxide coating for intelligent temperature control is in a range of 0.1~50%, a film can be effectively formed. From the application point of view, excessive solid content of the vanadium dioxide composite powders may affect the light transmittance of the coating, while insufficient content may result in the coating hardly demonstrating intelligent thermal insulation effects.

The dry film thickness of the vanadium dioxide coating for intelligent temperature control provided by the present invention may be 0.05~50 µm, preferably 0.5~10 µm. The temperature-control coating may be coated in a manner such as spraying, blade coating, brush coating, curtaining, or roller coating. For some cases where precision is highly required, roller coating may be generally adopted, and the coating thickness can be adjusted according to the mesh count of coating rollers and the solid content of the coating liquid. The dry film thickness can be as low as 0.05 µm when advanced roller coating technologies are adopted.

The vanadium dioxide composite powders and the vanadium dioxide composite powder slurry containing same of the present invention can be applied to the preparation of a coating or painting for intelligent energy saving, and the prepared coating is of high transparency, low haze, and strong ageing resistance, mainly used in flexible materials such as film, braided fabric, etc., as well as in thermal insulation cases such as glass and outer walls.

DETAILED DESCRIPTION OF THE EMBODIMENTS

Figure 1:
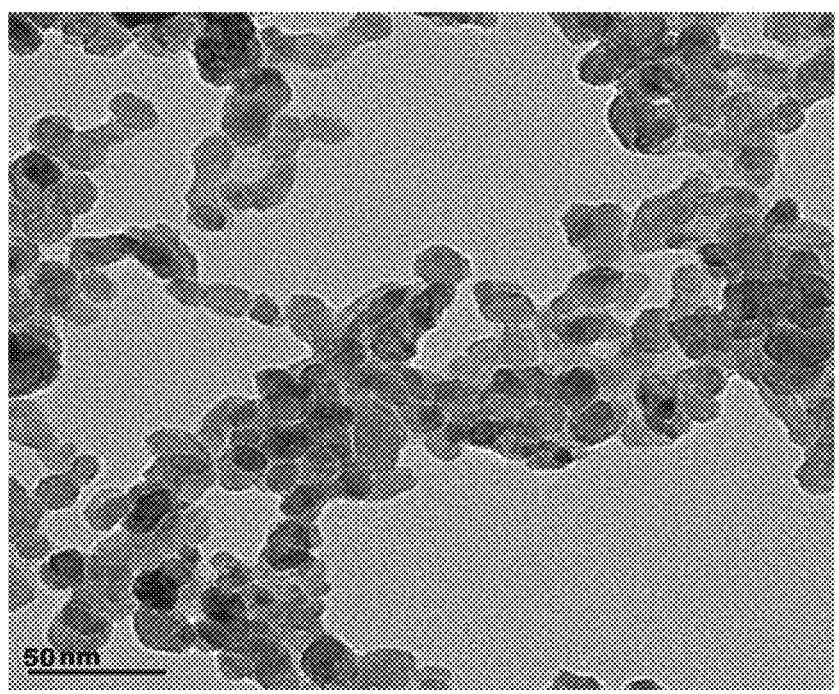
FIG. 1 is a transmission electron microscopy (TEM) image of vanadium dioxide powders without their surface being organically modified.

Hereinafter, the present invention will be further described with the following embodiment with reference to the drawings.

The preparation method of the vanadium dioxide composite powders comprises the following processes: dispersing vanadium dioxide nanopowders into a dispersion medium to obtain a mixture A; adding dispersion-assisting agents and organic modifiers for forming organic modifying long-chain molecules on a surface of the vanadium dioxide nanopowders into the mixture A, stirring until fully, evenly mixed to obtain a mixture B; and drying the mixture B to obtain the organically modified vanadium dioxide composite powders.

With regard to the above preparation method of the vanadium dioxide composite powders, specifically, 0.1~50 wt % of the vanadium dioxide powders and 50~99 wt % of the dispersion medium are stirred at high speed to be dispersed and mixed, and ultrasonically dispersed to obtain a mixture, then dispersion-assisting agents and organic modifiers are added to the mixture, and the resulting mixture is stirred at a constant temperature in the range of 0~200° C., and dispersed by means of ultrasound, sanding, or ball-milling, etc. Then they are centrifugation precipitated and the precipitates are dried under a vacuum at a certain temperature to obtain organically modified vanadium dioxide composite powders.

In the process of mixing the vanadium dioxide nanopowders and the dispersion medium, the weight ratio between them may be 1:1~1:20, preferably 1:1~1:10, more preferably 1:2~1:5. An insufficient weight ratio will reduce the probability of contact between vanadium dioxide nanopowders and the dispersion medium, while a long dispersion time and a large amount of modifier will be required; while an excessive weight ratio will do harm to full dispersion and wetting of the powders in the dispersion medium, affecting the effect of the subsequent modification.

In the surface modification of vanadium dioxide nanopowders, the organic modifiers may be stearic acid, polyacrylic acid, silane coupling agents, aluminate coupling agents, titanate coupling agents, etc., preferably silane coupling agents with macromolecular long chains. The amount of organic modifiers added to the mixture may be 0.05~5 wt %, preferably 0.1~2 wt %. If the content of the organic modifying long-chain molecules is too low, complete cladding for the surface of the powders will not be realized; on the other hand, if the content of the organic modifying long-chain molecules is too high, the organic molecules will tangle with each other, having a bad influence on the dispersion effect. By means of coupling agents, the surface of vanadium dioxide can be grafted with organic long-chain molecules, thereby greatly improving the chemical stability and dispersibility of vanadium dioxide powders. In addition, the dispersion-assisting agents may be one or more agents selected from the group consisting of polyvinyl alcohol, polyvinylpyrrolidone, organically modified polysiloxane dipropylene glycol monomethyl ether solution, silicone surfactants, fluorosurfactant, and other known dispersion-assisting agents in the art. The dispersion-assisting agents are mainly used for lowering the surface tension and improving the solvent wettability of the powder surface, thereby improving the dispersion effect. The amount of the dispersion-assisting agents added to the mixture may be 0.02~2 wt %, preferably 0.05~1 wt %. Adding a tiny amount is enough for achieving the desired dispersion effect. On the contrary, adding too much will affect the process of surface modification for the powders.

With regard to the preparation method of the vanadium dioxide powder slurry, specifically, 0.1~50 wt % of vanadium dioxide powders and 40~99 wt % of dispersion medium are mixed and stirred at high speed for pre-dispersion, then dispersion-assisting agents are added to the mixture, and the resulting mixture is stirred at high speed to obtain an evenly mixed vanadium dioxide powder slurry. Further, the slurry can be evenly mixed in a manner such as ultrasound, ball-milling, and/or sanding.

In the present invention, in both of the process for preparing vanadium dioxide composite powders and the process for preparing a composite powder slurry, the rotating speed of stirring may be 1000~3000 rad/min. The power of ultrasound may be 50~5000 W, and the frequency of ultrasound may be 21 KHz. Further, the rotating speed of a ball mill may be 10~2000 rad/min. Further, the rotating speed of a sand mill may be 10~2000 rad/min. The sanding medium may be $ZrO_2$ balls, and the particle size of the sanding medium may be 0.02 mm~50 mm. A sanding medium with a small size is preferred.

The vanadium dioxide coating for intelligent temperature control of the present invention is formed by mixing the vanadium dioxide powder slurry of the present invention, a polymer emulsion, and coating additives together to form a mixture and coating the mixture on a substrate. Specifically, 20~80 wt % of a polymer emulsion is added to 10~60 wt % of the vanadium dioxide powder slurry of the present invention, and then coating additives such as wetting-assisting agents, coalescing agents, leveling agents, defoaming agents, and/or thickening agents totaled to 0.01~5 wt % is added, and the resulting mixture is stirred at high speed for an appropriate time to obtain a mixed liquid (coating material) for forming a coating. The coating can be coated on a substrate in a manner such as spraying, blade coating, brush coating, curtaining, or roller coating. The substrate may be either a plastic film made from a material such as polypropylene (PP), polyethylene (PE), polyamide (PA), polyvinyl chloride (PVC), polyethylene terephthalate (PET), polymethyl methacrylate (PMMA), etc., or a fiber or a woven bag made from these materials.

The coalescing agents among the coating additives may be one or more additives selected from the group consisting of ethylene glycol monobutyl ether, propylene glycol monobutyl ether, dipropylene glycol methyl etheracetate, propylene glycol monobutyl ether, ethylene glycol propyl ether, and dipropyl ether.

The wetting-assisting agents among the coating additives may be one or more additives selected from the group consisting of dodecyl sulfates, dodecyl sulfonates, polyvinyl alcohol, polyvinylpyrrolidone, organosilicon compounds, and organofluorine compounds.

The defoaming agents among the coating additives may be one or more additives selected from the group consisting of dimethicone, ether ester compounds, modified mineral oil, glycerol ethoxylate, micromolecular metallorganics, and modified organosilicon polymers.

The leveling agents among the coating additives may be one or more additives selected from the group consisting of 2-butoxyethanol, cellulose acetate butyrate, polyacrylates, silicone oil, and modified organosilicon compounds.

The thickening agents among the coating additives may be cellulose thickening agents, polyethylene wax, fumed silica, polyacrylic acid thickening agents, or associative polyurethane thickening agents.

Furthermore, 0.2~2% of ultraviolet absorbents, such as benzophenone and derivatives thereof, 2-hydroxyphenyl benzotriazole and derivatives thereof, aromatic ester compounds, or hydroxyphenyl s-triazine and derivatives thereof may be added to the coating material.

Hereinafter, the present invention will be described more specifically with examples.

It should be understood that the embodiments described in detail above and the examples below are only for illustration of the present invention, and do not limit the scope of the present invention. The raw materials and reagents used can be obtained through purchase of commercially available starting materials or synthesized by conventional chemical transforming methods. All professional and scientific terms used herein have the same meaning with those familiar to a person skilled in the art, unless otherwise defined or explained. Moreover, any method or material equal or similar to the content recorded can be applied to the present invention. Other aspects of the present invention will be readily understood by a person skilled in the art due to the disclosure herein.

FIG. 1 is a TEM image of vanadium dioxide powders without their surfaces being organically modified; referring to FIG. 1, as for the morphology of the vanadium dioxide nanopowders without being organically modified, the powders are of a particle size ranging from 10~100 nm, and present in the form of agglomerated particles. However, the particles are loose.

Figure 2:
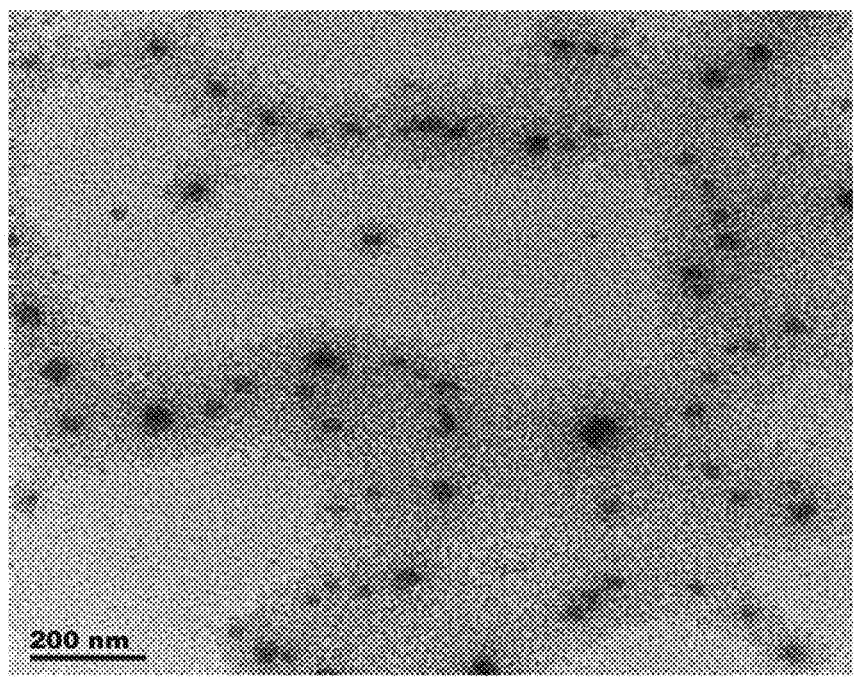
FIG. 2 is a transmission electron microscopy (TEM) image of vanadium dioxide powders with their surface having been organically modified.

FIG. 2 is a TEM image of vanadium dioxide powders with their surfaces having been organically modified; referring to FIG. 2, as for the morphology of vanadium dioxide powders with their surfaces having been organically modified, the powders are of a particle size ranging from 10~100 nm, which is slightly larger than that of the particles without being organically modified due to the organic group-cladding for the powder surface. However, the powders are dispersed.

Figure 3:
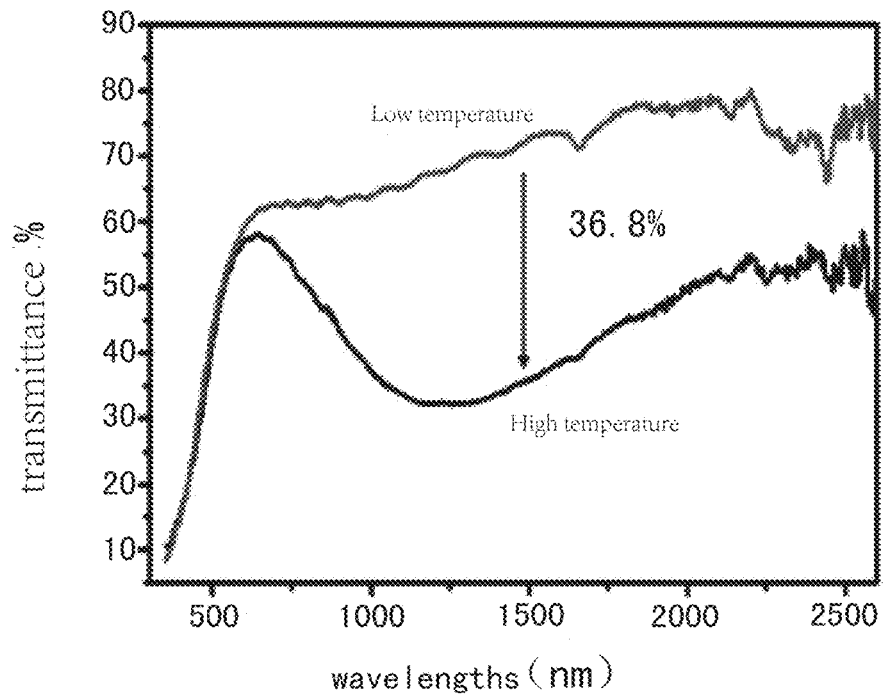
FIG. 3 is a high/low temperature graph of a vanadium dioxide coating for intelligent temperature control in an example of the present application, which is made from the vanadium dioxide composite powders and the slurry thereof of the present invention.

FIG. 3 is a high/low temperature graph of a vanadium dioxide coating for intelligent temperature control in an example of the present application (Example 1), which is made from the vanadium dioxide composite powders and the slurry thereof of the present invention; referring to FIG. 3, as for the coating in the example (Example 1), the visible light transmittance is 53.3% at a low temperature, while 51.8% at a high temperature, the sun light transmittance is 57% at a low temperature, while 43.6% at a high temperature, the phase-transition temperature is 40° C., the high/low temperature solar energy regulation efficiency can reach 13.4%, the high/low temperature infrared integral regulation is 24.2%, and the high/low temperature transmittance difference at IR 1500 nm can reach 36.8%.

Figure 4:
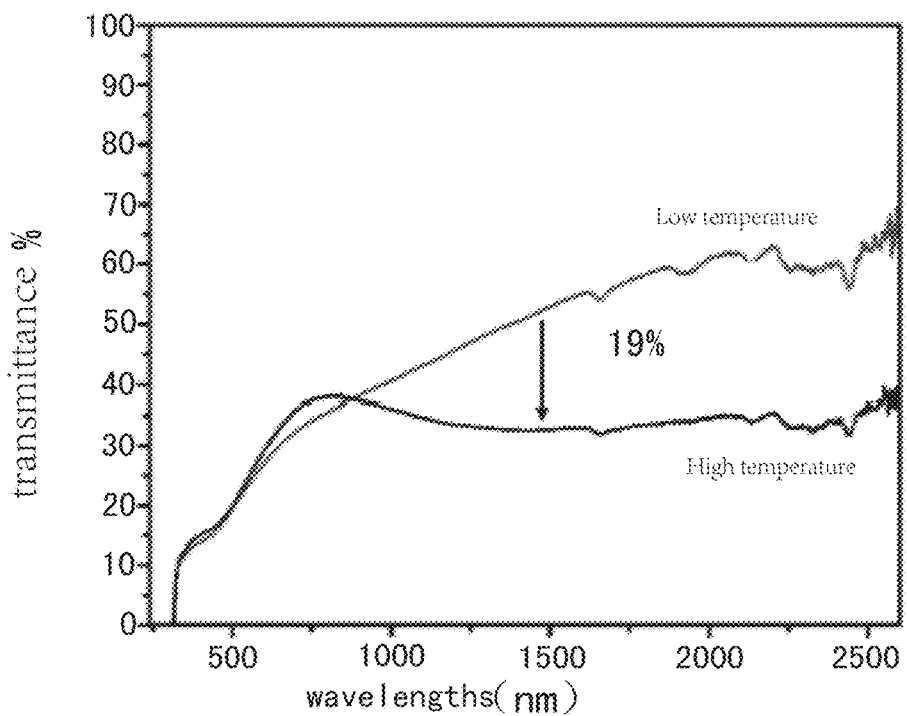
FIG. 4 is a high/low temperature graph of a vanadium dioxide coating for intelligent temperature control made from vanadium dioxide powders without being organically modified.

FIG. 4 is a high/low temperature graph of a vanadium dioxide coating for intelligent temperature control made from vanadium dioxide powders without being organically modified (Comparative Example 6), which has the following differences compared to a coating made from organically modified vanadium dioxide powders (FIG. 3): the high temperature curve is lower than the low temperature curve in the visible light region due to the bad dispersibility of the vanadium dioxide powders without being organically modified, while in the case that modified vanadium dioxide powders are used as starting material, the high temperature curve is higher than the low temperature curve in the visible light region; and the visible light transmittance and infrared control performance thereof are lower than the coating made from organically modified vanadium dioxide powders (FIG. 3).

EXAMPLE 1

(1) Surface Organic Modification of Vanadium Dioxide Nanopowders

Ingredients and the amounts thereof are as follows: Vanadium dioxide nanopowders (doped with W, particle size: 20~100 nm), 20 g; Ethanol (dispersion medium), 80 g; Silane coupling agent (with polyvinyl alcohol group, organic modifier), 1 g; and Polyvinylpyrrolidone (dispersion-assisting agent), 0.05 g. The vanadium dioxide nanopowders and dispersion medium are stirred and mixed at a speed of 1500 rad/min for 30 min, and dispersed under ultrasound for 30 min, then the dispersion-assisting agent and silane coupling agent are added to the mixture, and the resulting mixture is stirred in a high-speed stirrer at 70° C. for 2 h, then centrifugation precipitated, and the precipitates are dried under vacuum at 60° C. to obtain the organic silane coupling agent modified vanadium dioxide composite powders.

(2) Preparation of Vanadium Dioxide Composite Powder Slurry

Ingredients and the amounts thereof are as follows: Vanadium dioxide composite powders prepared in Step (1) of the present example, 4 g; Deionized water, 95.5 g; and Modified acrylic acid dispersion agent, 0.5 g. The organically modified nanopowders are added to deionized water, and the resulting mixture is stirred at high speed for 5 min for pre-dispersion, then the dispersion agent is added and dispersed under ultrasound for 60 min, then stirred in a high-speed stirrer for 2 h to obtain a vanadium dioxide composite powder slurry. The main performance of vanadium dioxide composite powders and the slurry thereof are shown in Table (3) Preparation of Vanadium Dioxide Coating for Intelligent Temperature Control Raw materials and the weight percentages thereof are as follows: Polymer emulsion (polyurethane emulsion): 40%; Vanadium dioxide composite powder slurry prepared in Step (2) of the present example (solid content: 4%): 30%; Deionized water: 28%; Coalescing agent (propylene glycol monobutyl ether): 0.5%; Wetting-assisting agent (polyvinyl alcohol): 0.2%; Leveling agent (polyacrylates): 0.25%; Defoaming agent (modified organosilicon compound): 0.25%; Thickening agent (cellulose thickening agents): 0.4%; and Ultraviolet absorbent (hydroxyphenyl s-triazine derivates): 0.5%. The acrylic acid emulsion and deionized water are added to the vanadium dioxide composite powder slurry, then the wetting-assisting agent, coalescing agent, leveling agent, defoaming agent, ultraviolet absorbent, and thickening agent are added, and the resulting mixture is stirred at a speed of 1500 rad/min for 1 h to obtain a water-based vanadium dioxide coating material for intelligent temperature control. The obtained coating material is coated on PET by roller coating, wherein the thickness of the coating layer is controlled at 3.5 μm. The basic performances of the coating for intelligent temperature control are shown in Table 2.

EXAMPLE 2

(1) Surface Organic Modification of Vanadium Dioxide Nanopowders

Ingredients and the amounts thereof are as follows: Vanadium dioxide nanopowders (without doped element, particle size: 20~60 nm), 10 g; Ethanol (dispersion medium), 90 g; Silane coupling agent (with long-chain alkylamino group, organic modifier), 1 g; and Polyvinyl alcohol (dispersion-assisting agent), 0.05 g. The vanadium dioxide nanopowders and dispersion medium are stirred and mixed at a speed of 1500 rad/min for 30 min, and dispersed under ultrasound for 30 min, then the dispersion-assisting agent and stearic acid are added to the mixture, and the resulting mixture is stirred in a high-speed stirrer at 60° C. for 2 h, then centrifugation precipitated, and the precipitates are dried under vacuum at 60° C. to obtain long-chain alkylamino group modified vanadium dioxide composite nanopowders.

(2) Preparation of Vanadium Dioxide Composite Powder Slurry

Ingredients and the amounts thereof are as follows: Vanadium dioxide composite powders prepared in Step (1) of the present example, 5 g; Deionized water, 94.5 g; and Polyacrylate dispersion agent, 0.05 g. The organically modified nanopowders are added to deionized water, and the resulting mixture is stirred at high speed for 10 min for pre-dispersion, then the dispersion agent is added and dispersed under ultrasound for 30 min, then stirred in a high-speed stirrer for 1 h to obtain a vanadium dioxide composite powder slurry. The main performance of vanadium dioxide composite powders and the slurry thereof are shown in Table (3) Preparation of Vanadium Dioxide Coating for Intelligent Temperature Control Raw materials and the weight percentages thereof are as follows: Polymer emulsion (polyurethane emulsion): 60%; Vanadium dioxide composite powder slurry prepared in Step (2) of the present example (solid content: 5%): 30%; Deionized water: 8.5%; Coalescing agent (propylene glycol monobutyl ether): 0.25%; Wetting-assisting agent (polyvinyl alcohol): 0.1%; Leveling agent (polyacrylates): 0.15%; Defoaming agent (modified organosilicon compound): 0.25%; Thickening agent (associative polyurethane thickening agents): 0.35%; and Ultraviolet absorbent (2-hydroxyphenyl benzotriazole derivates): 0.4%. The acrylic acid emulsion and deionized water are added to the vanadium dioxide composite powder slurry then the wetting-assisting agent, coalescing agent, leveling agent, defoaming agent, ultraviolet absorbent, and thickening agent are added, and the resulting mixture is stirred at a speed of 1500 rad/min for 1 h to obtain vanadium dioxide coating material for intelligent temperature control. The obtained coating material is coated on PET by roller coating, wherein the thickness of the coating layer is controlled at 2.5 μm. The basic performances of the coating for intelligent temperature control are shown in Table 2.

EXAMPLE 3

(1) Surface Organic Modification of Vanadium Dioxide Nanopowders

Ingredients and the amounts thereof are as follows: Vanadium dioxide nanopowders (doped with W, particle size: 20~100 nm), 15 g; Isopropanol (dispersion medium), 85 g; Silane coupling agent (with epoxy group, organic modifier), 1 g; and Organically modified polysiloxane dipropylene glycol monomethyl ether solution (dispersion-assisting agent), 0.08 g. The vanadium dioxide nanopowders and dispersion medium are stirred and mixed at a speed of 1000 rad/min for 20 min, and dispersed under ultrasound for 60 min, then the dispersion-assisting agent and silane coupling agent are added, and the resulting mixture is stirred in a high-speed stirrer at 80° C. for 2 h, then centrifugation precipitated, and the precipitates are dried under vacuum at 60° C. to obtain vanadium dioxide composite nanopowders grafted with epoxy group on surface.

(2) Preparation of Vanadium Dioxide Composite Powder Slurry

Ingredients and the amounts thereof are as follows: Vanadium dioxide composite powders prepared in Step (1) of the present example, 1.5 g; Deionized water, 98 g; and Modified polyester dispersion agent, 0.5 g. The organically modified nanopowders are added to deionized water, and the resulting mixture is stirred at high speed for 5 min for pre-dispersion, then the dispersion agent is added and dispersed under ultrasound for 20 min, then stirred in a high-speed stirrer for 1 h to obtain a vanadium dioxide composite powder slurry. The main performance of vanadium dioxide composite powders and the slurry thereof are shown in Table 1.

(3) Preparation of Vanadium Dioxide Coating for Intelligent Temperature Control

Raw materials and the weight percentages thereof are as follows: Polymer emulsion (acrylic acid emulsion): 45%; Vanadium dioxide composite powder slurry prepared in Step (2) of the present example (solid content: 1.5%): 45%; Deionized water: 5%; Coalescing agent (diphenyl ether): 0.5%; Wetting-assisting agent (organosilicon compound): 0.2%; Leveling agent (modified organosilicon compound): 0.25%; Defoaming agent (micromolecular metallorganics): 0.25%; Thickening agent (associative polyurethane thickening agents): 0.8%; and Ultraviolet absorbent (2-hydroxyphenyl benzotriazole derivates): 0.5%. The acrylic acid emulsion and deionized water are added to the vanadium dioxide composite powder slurry, then the wetting-assisting agent, coalescing agent, leveling agent, defoaming agent, ultraviolet absorbent, and thickening agent are added, and the resulting mixture is stirred at a speed of 2500 rad/min for 3 h to obtain vanadium dioxide coating material for intelligent temperature control. The obtained coating material is coated on PET by spraying, wherein the thickness of the coating layer is controlled at 6.5 μm. The basic performances of the coating for intelligent temperature control are shown in Table 2.

EXAMPE 4

(1) Surface Organic Modification of Vanadium Dioxide Nanopowders

Ingredients and the amounts thereof are as follows: Vanadium dioxide nanopowders (doped with Mo, particle size: 20~100 nm), 25 g; Isopropanol (dispersion medium), 75 g; Titanate coupling agent (with epoxy group, organic modifier), 1 g; and Polyvinyl alcohol (dispersion-assisting agent), 0.15 g. The vanadium dioxide nanopowders and dispersion medium are stirred and mixed at a speed of 1500 rad/min for 20 min, and dispersed under ultrasound for 60 min, then the dispersion-assisting agent and titanate coupling agent are added to the mixture, and the resulting mixture is stirred in a high-speed stirrer at 80° C. for 2 h, then centrifugation precipitated, and the precipitates are dried under vacuum at 70° C. to obtain vanadium dioxide composite nanopowders grafted with epoxy groups on their surface.

(2) Preparation of Vanadium Dioxide Composite Powder Slurry

Ingredients and the amounts thereof are as follows: Vanadium dioxide composite powders prepared in Step (1) of the present example, 3 g; Deionized water, 96.95 g; and Modified acrylic acid dispersion agent, 0.05 g. The organically modified nanopowders are added to deionized water, and the resulting mixture is stirred at high speed for 5 min for pre-dispersion, then the dispersion agent is added and dispersed under ultrasound for 30 min, then stirred in a high-speed stirrer for 1 h to obtain a vanadium dioxide and doped vanadium dioxide nanopowder slurry. The main performance of vanadium dioxide composite powders and the slurry thereof are shown in Table 1.

(3) Preparation of Vanadium Dioxide Coating for Intelligent Temperature Control

Raw materials and the weight percentages thereof are as follows: Polymer emulsion (acrylic acid emulsion): 50%; Vanadium dioxide composite powder slurry prepared in Step (2) of the present example (solid content: 3%): 30%; Deionized water: 18.5%; Coalescing agent (ethylene glycol monobutyl ether): 0.2%; Wetting-assisting agent (organosilicon compound): 0.05%; Leveling agent (cellulose acetate butyrate): 0.2%; Defoaming agent (modified mineral oil): 0.35%; Thickening agent (polyacrylic acid thickening agents): 0.2%; and Ultraviolet absorbent (benzophenone derivates): 0.5%. The acrylic acid emulsion and deionized water are added to the vanadium dioxide composite powder slurry, then the wetting-assisting agent, coalescing agent, leveling agent, defoaming agent, ultraviolet absorbent, and thickening agent are added, and the resulting mixture is stirred at a speed of 2500 rad/min for 2 h to obtain a vanadium dioxide coating material for intelligent temperature control. The obtained coating material is coated on PET by roller coating, wherein the thickness of the coating layer is controlled at 2.5 μm. The basic performances of the coating for intelligent temperature control are shown in Table 2.

EXAMPLE 5

(1) Surface Organic Modification of Vanadium Dioxide Nanopowders

Ingredients and the amounts thereof are as follows: Vanadium dioxide nanopowders (doped with W, particle size: 20~100 nm), 5 g; Isopropanol (dispersion medium), 95 g; Aluminate coupling agent (with long-chain alkylamino group, organic modifier), 0.7 g; and Polyvinylpyrrolidone (dispersion-assisting agent), 0.04 g. The vanadium dioxide nanopowders and dispersion medium are stirred and mixed at a speed of 1500 rad/min for 20 min, and dispersed under ultrasound for 60 min, then the dispersion-assisting agent and aluminate coupling agent are added to the mixture, and the resulting mixture is stirred in a high-speed stirrer at 80° C. for 2 h, then centrifugation precipitated, and the precipitates are dried under vacuum at 60° C. to obtain vanadium dioxide nanopowders grafted with long-chain alkyl groups on their surface.

(2) Preparation of Vanadium Dioxide Composite Powder Slurry

Ingredients and the amounts thereof are as follows: Vanadium dioxide composite powders prepared in Step (1) of the present example, 4 g; Deionized water, 95.5 g; and Modified polyurethane dispersion agent, 0.5 g. The organically modified nanopowders are added to deionized water, and the resulting mixture is stirred at high speed for 5 min for pre-dispersion, then the dispersion agent is added and dispersed under ultrasound for 60 min, then stirred in a high-speed stirrer for 2 h to obtain a vanadium dioxide composite powder slurry. The main performance of vanadium dioxide composite powders and the slurry thereof are shown in Table 1.

(3) Preparation of Vanadium Dioxide Coating for Intelligent Temperature Control

Raw materials and the weight percentages thereof are as follows: Polymer emulsion (polyurethane emulsion): 70%; Vanadium dioxide composite powder slurry prepared in Step (2) of the present example (solid content: 4%): 20%; Deionized water: 8.5%; Coalescing agent (propylene glycol monobutyl ether): 0.5%; Wetting-assisting agent (polyvinyl alcohol): 0.2%; Leveling agent (polyacrylates): 0.25%; Defoaming agent (modified organosilicon compound): 0.25%; and Thickening agent (cellulose thickening agents): 0.4%. The acrylic acid emulsion and deionized water are added to the vanadium dioxide composite powder slurry, then the wetting-assisting agent, coalescing agent, leveling agent, defoaming agent, ultraviolet absorbent, and thickening agent are added, and the resulting mixture is stirred at a speed of 1500 rad/min for 1 h to obtain water-based vanadium dioxide coating material for intelligent temperature control. The obtained coating material is coated on PET by blade coating, wherein the thickness of the coating layer is controlled at 5.5 μm. The basic performances of the coating for intelligent temperature control are shown in Table 2.

COMPARATIVE EXAMPLE 6

(1) The unmodified vanadium dioxide nanopowders used in Step (1) of the above Example 1, 4 g; Deionized water, 95.5 g; and Modified acrylic acid dispersion agent, 0.5 g; The unmodified nanopowders are added to deionized water, and the resulting mixture is stirred at high speed for 5 min for pre-dispersion, then the dispersion agent is added and dispersed under ultrasound for 60 min, then stirred in a high-speed stirrer for 2 h to obtain a vanadium dioxide powder slurry. The main performance of vanadium dioxide powders and the slurry thereof are shown in Table 1;

(2) The prepared slurry in Step (1) of the present comparative example is used, and the raw materials are prepared as follows.

Raw materials and the weight percentages thereof are as follows: Polymer emulsion (polyurethane emulsion): 40%; Vanadium dioxide composite powder slurry prepared in Step (1) of the present comparative example (solid content: 4%): 30%; Deionized water: 28%; Coalescing agent (propylene glycol monobutyl ether): 0.5%; Wetting-assisting agent (polyvinyl alcohol): 0.2%; Leveling agent (polyacrylates): 0.25%; Defoaming agent (modified organosilicon compound): 0.25%; Thickening agent (cellulose thickening agents): 0.4%; and Ultraviolet absorbent (hydroxyphenyl s-triazine derivates): 0.5%; The acrylic acid emulsion and deionized water are added to the vanadium dioxide powder slurry, then the wetting-assisting agent, coalescing agent, leveling agent, defoaming agent, ultraviolet absorbent, and thickening agent are added, and the resulting mixture is stirred at a speed of 1500 rad/min for 1 h to obtain a water-based vanadium dioxide coating material for intelligent temperature control. The obtained coating material is coated on PET by roller coating, wherein the thickness of the coating layer is controlled at 5.5 μm. The basic performances of the coating for intelligent temperature control are shown in Table 2.

Referring to Table 1, with regard to the organically modified vanadium dioxide composite powders and the slurry thereof obtained by the methods provided by the present invention, the particle size is significantly smaller than that of the unmodified powders, the BET (Brunauer-Emmett-Teller) specific surface area is larger than that of the unmodified powders, and the stability of the slurry is significantly better than that of the unmodified slurry. It can be seen from the weight-loss data at 300° C. that the surfaces of the nanopowders are grafted with 5~10% of organic long chains by means of the process of surface organic modification, thereby greatly improving the chemical stability and dispersibility of vanadium dioxide powders.

TABLE 1

|  | Example 1 | Example 2 | Example 3 | Example 4 | Example 5 | Comparative Example 6 |
|---|---|---|---|---|---|---|
| Modifier | Silane coupling agent with water-soluble long chains | Silane coupling agent with water-soluble long chains | Silane coupling agent with water-soluble long chains | Water-based titanate coupling agent | Water-based aluminate coupling agent | Unmodified |
| Surface group | Polyvinyl alcohol | Long-chain alkylamino group | Epoxy functional group | Epoxy functional group | Long-chain alkylamino group | — |
| Dynamic laser scattering particle size (nm) | 20~100 | 50~300 | 20~150 | 50~150 | 50~200 | 20~200 |
| BET specific surface area (m$^3$/g) | 60~70 | 45~55 | 50~60 | 50~60 | 45~55 | 40~50 |
| Powder surface performance | Hydrophilic | Hydrophilic | Hydrophilic | Hydrophilic | Hydrophilic | Hydrophilic |
| Weight-loss at 300° C. | 12% | 4% | 10% | 8% | 7% | 1% |
| Slurry stability after 3-month storage | No precipitation | Slight precipitation | No precipitation | No precipitation | Slight precipitation | Severe precipitation |

Referring to Table 2, the coating of the present invention possesses high visible light transmittance, while it almost completely shields ultraviolet rays, accompanied by intelligent regulation for infrared ray of high energy among the sunlight (seen from the high/low temperature infrared transmittance difference), being of transparent and clear appearance, ageing resistance, watertightness, favorable adhesion to substrates, and strong brush resistance; and as compared with the slurry of VO$_2$ without being organically modified (Comparative Example 6), the coating obtained by the present method is of higher intelligent regulation rate, lower visible light transmittance, and lower haze.

haze, and strong ageing resistance, mainly used in flexible materials such as film, braided fabric, etc., in thermal insulation cases such as glass and outer walls, as well as energy conservation and emissions reduction devices such as energy-saving films, energy-saving painting, and solar temperature control devices; or energy information devices such as micro-photoelectric switching devices, thermistors, battery materials, and optical data storage devices. The preparation method of vanadium dioxide composite powders provided by the present invention uses innovative preparation technologies, and the surface modification process by organic modifiers can effectively improve the dispersibility and chemical stability of vanadium dioxide (VO$_2$) nanopowders and doped vanadium dioxide nanopowders.

TABLE 2

(performance test of coating)

|  |  | Example 1 | Example 2 | Example 3 | Example 4 | Example 5 | Comparative Example 6 |
|---|---|---|---|---|---|---|---|
| Matrix resin |  | Polyurethane emulsion | Polyurethane emulsion | acrylic acid emulsion | acrylic acid emulsion | Polyurethane emulsion | Polyurethane emulsion |
| VO$_2$ particle |  | Organically modified | Organically modified | Organically modified | Organically modified | Organically modified | Unmodified |
| Coating manner |  | Roller coating | Roller coating | Spraying | Roller coating | Blade coating | Blade coating |
| Coating thickness |  | 3.5 um | 4.5 um | 6.5 um | 2.5 um | 5.5 um | 5.5 um |
| Visible light transmittance |  | 53% | 38% | 55% | 65% | 45% | 30 |
| Infrared transmittance | High temperature | 37.1% | 30% | 43.5% | 35% | 38% | 35% |
|  | Low temperature | 61.3% | 47% | 70% | 55% | 58% | 45% |
| Infrared regulation rate |  | 24.2% | 17% | 26.5% | 20% | 20% | 10% |
| High/low temperature difference at 1500 nm |  | 36.8% | 23% | 35.6% | 30% | 28% | 19% |
| Ultraviolet rejection |  | 99% | 99% | 99% | 99% | 90% | 92% |
| Water-resistance |  | No abnormalities for 96 h | No abnormalities for 96 h | No abnormalities for 96 h | No abnormalities for 96 h | No abnormalities for 96 h | No abnormalities for 96 h |
| Artificial climate ageing resistance |  | No peeling, no frothing, and no crack for 1000 h | No peeling, no frothing, and no crack for 1000 h | No peeling, no frothing, and no crack for 1000 h | No peeling, no frothing, and no crack for 1000 h | No peeling, no frothing, and no crack for 1000 h | No peeling, no frothing, and no crack for 1000 h |
| Brush resistance/time |  | 5000 | 5000 | 7000 | 7000 | 5000 | 5000 |
| Coating haze |  | <5% | <15% | <10% | <5% | <8% | >15% |
| Temperature resistance of coating |  | No abnormalities | No abnormalities | No abnormalities | No abnormalities | No abnormalities | No abnormalities |

INDUSTRIAL APPLICABILITY

The vanadium dioxide composite powers can be applied to preparing a coating or painting for intelligent energy saving. The prepared coating is of high transparency, low

The invention claimed is:

1. A method for preparing vanadium dioxide composite powders, comprising the following processes:

process (1) dispersing vanadium nanopowders with a chemical composition of $V_{1-x}M_xO_2$ into a dispersion medium A to obtain a mixture A;

process (2) adding dispersion-assisting agents and organic modifiers for forming organic modifying long-chain molecules on a surface of the vanadium dioxide nanopowders into the mixture A and mixing by stirring to obtain a mixture B; and process (3) drying the mixture B to obtain the vanadium dioxide composite powders, the surfaces of which are grafted with organic modifying long-chain molecules; wherein M represents doping elements;

$0 \leq x \leq 0.5$;

the organic modifying long-chain molecules are 0.1~50 wt % of the vanadium dioxide nanopowders;

the organic modifying long-chain molecules are functionalized organic long chains, or long-chain alkyls; and the functionalized organic long chains are polyacrylic acid groups, polyvinyl alcohol groups, epoxy groups, long-chain alkylamino groups, halogenated long-chain alkyls, and/or carboxylated long-chain alkyls.

2. The method for preparing vanadium dioxide composite powders according to claim 1, wherein the organic modifying long-chain molecules are 1~10 wt % of the vanadium dioxide nanopowders.

3. The method for preparing vanadium dioxide composite powders according to claim 1, wherein the length of the organic modifying long-chain molecules is 0.1 nm~100 nm.

4. The method for preparing vanadium dioxide composite powders according to claim 1, wherein the vanadium dioxide powders are rutile vanadium dioxide powders, with a phase transition temperature adjustable in a range of −20~70° C.

5. The method for preparing vanadium dioxide composite powders according to claim 1, wherein a particle size of the vanadium dioxide composite powders is 200 nm or less.

6. The method for preparing vanadium dioxide composite powders according to claim 1, wherein the dispersion medium A in process (1) is ethanol, isopropanol, chloroform, dimethylformamide, dimethyl sulfoxide, dichloroethane, and/or acetone.

7. The method for preparing vanadium dioxide composite powders according to claim 1, wherein in process (2), a weight ratio between the vanadium dioxide nanopowders and the dispersion medium A is 1:1~1:20.

8. The method for preparing vanadium dioxide composite powders according to claim 1, wherein the organic modifiers added in process (2) are stearic acid, polyacrylic acid, silane coupling agents, aluminate coupling agents, and/or titanate coupling agents.

9. The method for preparing vanadium dioxide composite powders according to claim 1, wherein an addition amount of the organic modifiers is 0.05~5 wt % of the mixture A.

10. A method for preparing vanadium dioxide composite powders, comprising the following processes:

process (1) dispersing vanadium nanopowders with a chemical composition of $V_{1-x}M_xO_2$ into a dispersion medium A to obtain a mixture A;

process (2) adding dispersion-assisting agents and organic modifiers for forming organic modifying long-chain molecules on a surface of the vanadium dioxide nanopowders into the mixture A and mixing by stirring to obtain a mixture B; and process (3) drying the mixture B to obtain the vanadium dioxide composite powders, the surfaces of which are grafted with organic modifying long-chain molecules; wherein M represents doping elements;

$0 \leq x \leq 0.5$;

the organic modifying long-chain molecules are 0.1~50 wt % of the vanadium dioxide nanopowders; and in process (2), the dispersion-assisting agents are one or more agents selected from the group consisting of polyvinyl alcohol, polyvinylpyrrolidone, organically modified polysiloxane dipropylene glycol monomethyl ether solution, silicone surfactants, and/or fluorosurfactants.

11. The method for preparing vanadium dioxide composite powders according to claim 10, wherein an addition amount of the dispersion-assisting agents is 0.02~2 wt % of the mixture A.

12. A method for preparing a vanadium dioxide powder slurry, comprising the process (1), process (2), and process (3) of the method for preparing vanadium dioxide composite powders as claimed in claim 1, further comprising:

process (4) dispersing the vanadium dioxide composite powders obtained in process (3) into a dispersion medium B to obtain the vanadium dioxide powder slurry.

13. The method for preparing the vanadium dioxide powder slurry according to claim 12, wherein the dispersion medium B is one or more solvents selected from the group consisting of deionized water, ethanol, propanol, isopropanol, ethyl acetate, toluene, and butanone.

14. The method for preparing the vanadium dioxide powder slurry according to claim 12, wherein a weight ratio between the vanadium dioxide composite powders and the dispersion medium B is 1:1~1:1000.

15. The method for preparing the vanadium dioxide powder slurry according to claim 13, wherein the weight ratio between the vanadium dioxide composite powders and the dispersion medium B is 1:10~1:100.

16. A method for preparing a vanadium dioxide coating for dual temperature control, comprising the process (1), process (2), process (3), and process (4) of the method for preparing the vanadium dioxide composite powder slurry as claimed in claim 12, further comprising:

process (5) mixing the vanadium dioxide powder slurry obtained in process (4), a polymer emulsion, and coating additives together to form a mixture and coating the mixture on a substrate to form the vanadium dioxide coating for dual temperature control.

17. The method for preparing the vanadium dioxide coating for dual temperature control according to claim 16, wherein the polymer emulsion is an aqueous dispersion or an emulsion of polymer resin; and the polymer resin is one or more resins selected from the group consisting of polyacrylic acid resins, polyester resins, polyurethane resins, silicone resins, alkyd resins, and epoxy resins.

18. The method for preparing the vanadium dioxide coating for dual temperature control according to claim 16, wherein the coating additives include coalescing agents, wetting-assisting agents, defoaming agents, thickening agents, and/or levelling agents.

19. The method for preparing the vanadium dioxide coating for dual temperature control according to claim 16, wherein the mixture is coated on the substrate by spraying, blade coating, brush coating, curtaining, or roller coating.

* * * * *